United States Patent
McNeill

(10) Patent No.: US 10,472,086 B2
(45) Date of Patent: Nov. 12, 2019

(54) SENSOR-BASED DETECTION OF LANDING ZONES

(71) Applicant: Sikorsky Aircraft Corporation, Stratford, CT (US)

(72) Inventor: William McNeill, Stratford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 148 days.

(21) Appl. No.: 15/463,430

(22) Filed: Mar. 20, 2017

(65) Prior Publication Data

US 2017/0283087 A1   Oct. 5, 2017

Related U.S. Application Data

(60) Provisional application No. 62/315,986, filed on Mar. 31, 2016.

(51) Int. Cl.
| | |
|---|---|
| B64D 45/08 | (2006.01) |
| G06F 7/02 | (2006.01) |
| B64F 1/18 | (2006.01) |
| G01S 17/89 | (2006.01) |
| G06F 16/25 | (2019.01) |
| G01S 17/42 | (2006.01) |
| G01S 7/48 | (2006.01) |

(52) U.S. Cl.
CPC ............... *B64D 45/08* (2013.01); *B64F 1/18* (2013.01); *G01S 7/4808* (2013.01); *G01S 17/42* (2013.01); *G01S 17/89* (2013.01); *G06F 7/02* (2013.01); *G06F 16/252* (2019.01)

(58) Field of Classification Search
CPC ......... B64D 45/04; B64D 45/08; G10S 17/88; G10S 17/89; G01S 17/88; G01S 17/89; G01S 17/42; G01S 7/4808
USPC ..................................................... 701/17, 16
See application file for complete search history.

(56) References Cited

U.S. PATENT DOCUMENTS

| | | | | |
|---|---|---|---|---|
| 10,001,376 | B1* | 6/2018 | Tiana | G01C 21/005 |
| 2006/0050928 | A1* | 3/2006 | Ogawa | G06K 9/4609 |
| | | | | 382/103 |
| 2007/0250224 | A1* | 10/2007 | Dwyer | G01C 23/005 |
| | | | | 701/16 |
| 2009/0214079 | A1* | 8/2009 | Hamza | G06K 9/00798 |
| | | | | 382/103 |
| 2010/0039294 | A1* | 2/2010 | Feyereisen | G06K 9/0063 |
| | | | | 340/972 |
| 2012/0261516 | A1* | 10/2012 | Gilliland | G01S 17/107 |
| | | | | 244/183 |
| 2014/0297168 | A1* | 10/2014 | Ovens | G01C 21/3626 |
| | | | | 701/120 |

(Continued)

OTHER PUBLICATIONS

ArcMap, What is lidar data?, Feb. 21, 2016, Environmental Systems Research Institute, Inc. Website(esri) <http://desktop.arcgis.com/en/arcmap/10.3/manage-data/las-dataset/what-is-lidar-data-.htm> (Year: 2016).*

(Continued)

*Primary Examiner* — Nadeem Odeh
(74) *Attorney, Agent, or Firm* — Cantor Colburn LLP

(57) ABSTRACT

A method of detecting a landing zone includes scanning an area using a sensor system to obtain data of the area. One or more markings are identified from the data. The one or more markings are verified as corresponding to an intended landing zone.

14 Claims, 4 Drawing Sheets

(56) References Cited

U.S. PATENT DOCUMENTS

2015/0032299 A1 1/2015 Puyou et al.
2016/0122038 A1* 5/2016 Fleischman ............... G06T 7/73
 701/2
2016/0379499 A1* 12/2016 Balasubramanian ........................
 G08G 5/0013
 701/300

OTHER PUBLICATIONS

Naidu et al., Detection of Airport Runway Edges using Line Detection Techniques, Sep. 2011, National Aerospace Laboratories (CSIR-NAL) (Year: 2011).*

MathWorks, Edge Detection Methods for Finding Object Boundaries in Images, Dec. 12, 2015, MathWorks Website <https://www.mathworks.com/discovery/edge-detection.html> (Year: 2015).*

* cited by examiner

SENSOR-BASED DETECTION OF LANDING ZONES

CROSS REFERENCE TO RELATED APPLICATION

This application claims the benefit of U.S. Provisional Application Ser. No. 62/315,986 filed Mar. 31, 2016, the entire disclosure of which is incorporated herein by reference.

FIELD

Embodiments herein relate to detection systems, and more particularly to detecting landing zones using sensors.

BACKGROUND

Landing an aerial vehicle is a very challenging problem. In operations involving aircraft, such as helicopters and airplanes, it is critical to detect landing zones and perform safe landing operations. However, landing operations can be difficult in numerous situations, such as emergency landings or under low visibility conditions. Pilots spend numerous hours practicing touchdowns because of the risk involved during landing phase. While autonomous landing technologies have been an active area of research, autonomous landing zone detection capabilities are currently limited to looking for large flat areas. As such, to an autonomous landing zone detection system, most of an airport would look like a feasible site. This means the system may choose to land on an inappropriate location, such as an active taxiway or a patch of grass, where air traffic controllers may not approve. Therefore, while current systems may be capable of detecting potential landing zones, the results may not be practical.

Conventional methods and systems have generally been considered satisfactory for their intended purpose. However, there is still a need in the art for systems and methods that provide for improved detection of landing zones. The present disclosure provides a solution for this need.

SUMMARY

A method of detecting a landing zone includes scanning an area using a sensor system to obtain data of the area. One or more markings are identified from the data. The one or more markings are verified as corresponding to an intended landing zone.

Scanning the area can include using a LIDAR system configured to emit an optical beam to obtain point cloud data of the area based on a returned portion of the optical beam. The point cloud data can be filtered based on intensity of the returned portion of the optical beam.

The LIDAR system can include a laser and an optical sensor and the area corresponds to one of a helipad and a runway. The point cloud data can be obtained as a continuous stream of points that includes intensity information for the scanned area. Filtering the point cloud data can include searching for points that are higher in intensity than neighboring points. Filtering can include performing edge detection on the point cloud data. Identifying one or more markings can include running filtered points through a template matching algorithm comparing the one or more markings against one or more templates stored in a database. Identifying one or more markings can further include using optical character recognition techniques.

A system for detecting a landing zone includes a sensor system, and a processor operatively connected to the sensor system and configured to perform machine readable instructions that, when executed by the processor, cause the system to scan an area using a sensor system to obtain data of the area. One or more markings are identified from the data. The one or more markings are verified as corresponding to an intended landing zone.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures.

DETAILED DESCRIPTION

Figure 1:
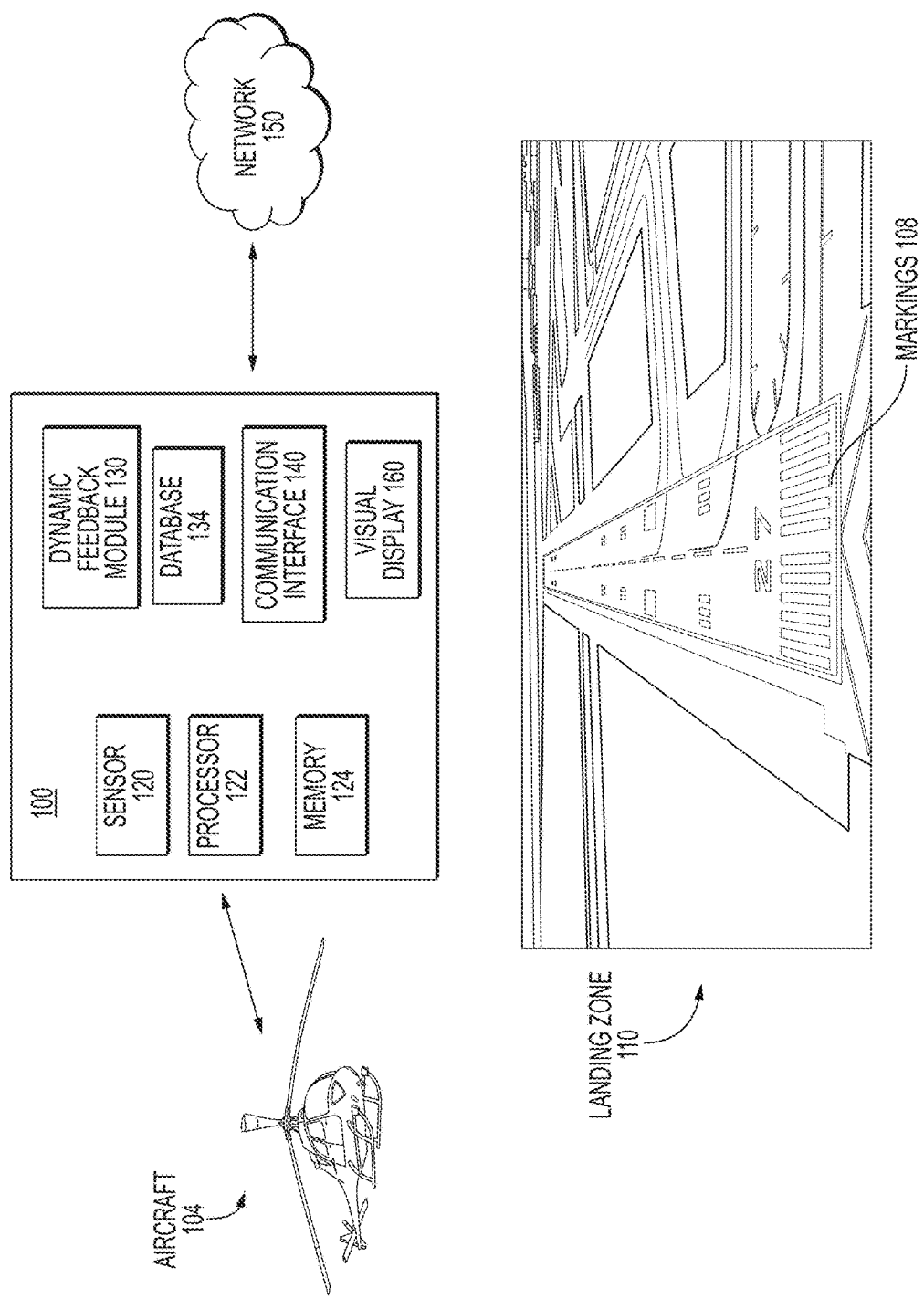
FIG. 1 is a schematic view of an exemplary embodiment of a system for autonomous detection of landing zones constructed in accordance with the present disclosure, showing the system in communication with an aircraft.

Reference will now be made to the drawings wherein like reference numerals identify similar structural features or aspects of the subject disclosure. For purposes of explanation and illustration, and not limitation, a partial view of an exemplary embodiment of a method and system for imaging a moving object in accordance with the disclosure is shown in FIG. 1 and is designated generally by reference character 100. Other embodiments of the system and method in accordance with the disclosure, or aspects thereof, are provided in FIGS. 2-4, as will be described. Systems and methods described herein can be used for detection of landing zones using laser imaging (LIDAR). While various embodiments described herein use LIDAR systems, it is to be appreciated that certain embodiments can also include red, green, blue, depth/distance (RGBD) sensors, geo-referenced camera data, or any other suitable sensors.

Many scenarios involve an automated evaluation of images and/or data of an environment to detect the presence of certain objects/markings to identify the position, size and characteristics of the area. With reference to FIG. 1, one exemplary embodiment can include detecting a landing zone 110 based on certain markings 108 so as to guide an aircraft 104 onto the landing zone 110 at, for example, an airport. The analysis may be done in realtime or near-realtime and may involve the capturing of point cloud data. Those skilled in the art will readily appreciate that the system and method described herein are suitable for various other applications wherein detection of an object/area based on distinguishing features is useful.

The system 100 of FIG. 1 for detecting and identifying a landing zone based on markings/features on the landing zone. The system 100 is shown operatively connected to the aircraft 104. The aircraft 104 may be a manned aircraft, an unmanned aerial vehicle (UAV) or a piloted aircraft co-piloted with automated systems. Moreover, it will be understood that the system 100 can be integrated into aircraft 104 or remotely connected to the aircraft 104 via network 150. The system 100 includes one or more sensors 120 operatively connected to a processor 122 connected to a memory 124. The one or more sensors 120 can include a LIDAR capturing device, which emits a set of focused, low-power beams of light of a specified wavelength that detects and records the reflection of wavelengths of light from various objects. The LIDAR data can be used to generate a LIDAR point cloud, representing the LIDAR points of light reflected from the object. By capturing and evaluating LIDAR point data, a representation of the area with intensity information may be provided. The area to be captured using system 100 can be set either automatically by an algorithm implemented by the processor or set manually by a user of the system 100.

The system 100 and method 200 (shown in FIG. 2) described herein can be used to detect landing zones, such as landing zone 110, based on the point data from the LIDAR. The system 100 further includes a dynamic feedback module 130. The system 100 further includes a database 134. Database 134 may include data corresponding to templates of various helipads, helipad markings, runway types, runway markings, and any other types of markings/structures relevant to identifying landing zones. For example, database 134 may include templates of runway numbers, centerlines, threshold and touchdown markings, etc. Communication connections 140 may be included in the system 100, for example, as a modem, an integrated network interface, a radio interface, or the like. Communication connections 140 may include a wired or wireless communication to transmit and receive communication. For example, as shown, communication connections 140 may be connected to a network 150 and thus be operated remotely, for example, in UAVs. Network 150 may be a communication link comprising an internet connection, Ethernet link, local area link, cellular link, satellite link, global system for mobile communication (GSM), etc. The system 100 further includes a visual display 160 to display the point cloud data being imaged. Those skilled in the art will recognize that system may include additional features and/or functionality not shown and described without departing from the scope of the present disclosure.

Figure 2:
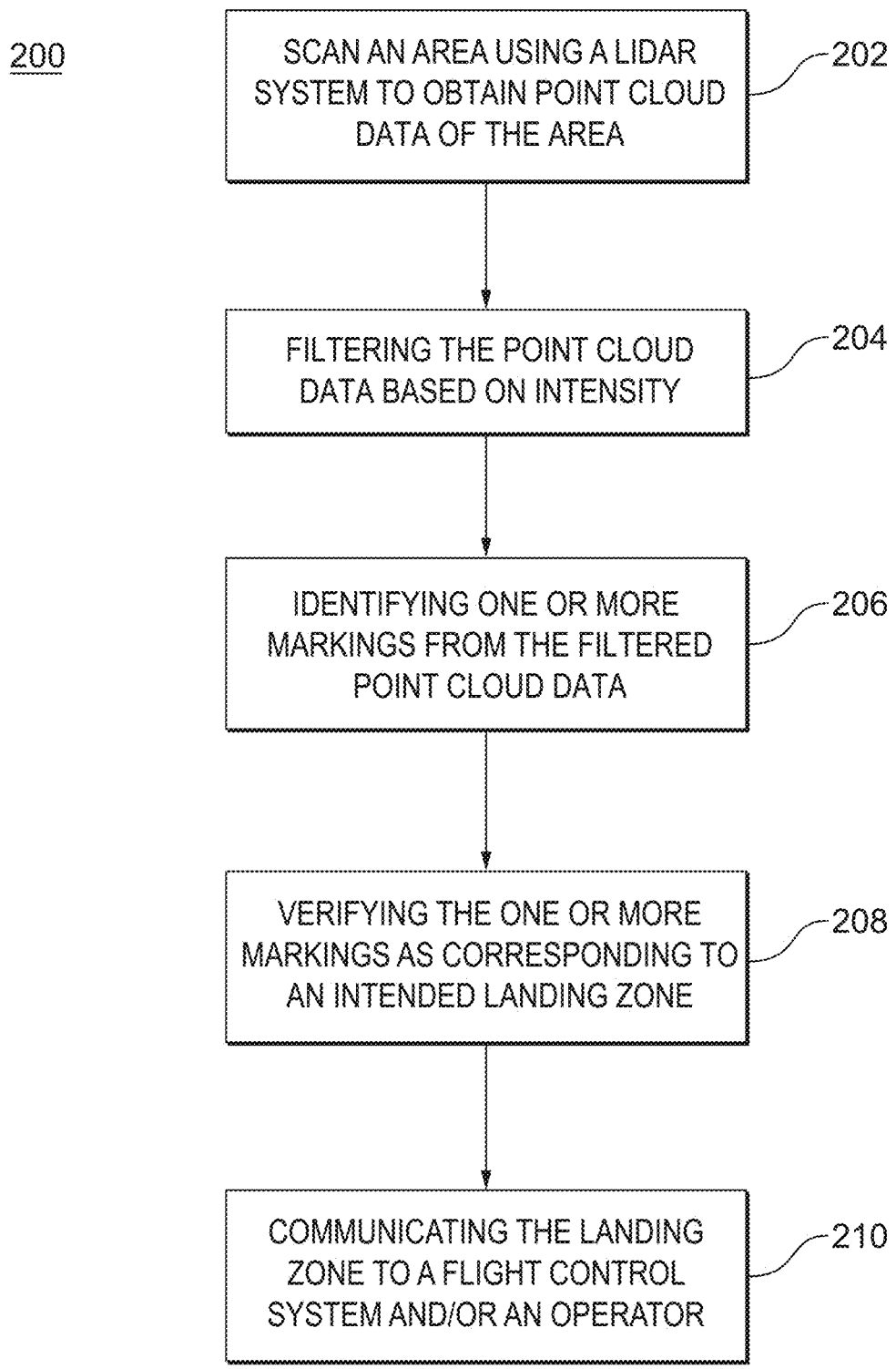
FIG. 2 is a schematic view of an exemplary embodiment of a method of employing the system of FIG. 1.

With reference to FIG. 2, the method 200 may be implemented, e.g., as a set of instructions stored in the memory 124 of the system 100 that, when executed by the processor 122, cause the processor to operate according to the steps herein. The method 200 begins at step 202 by executing the instructions on the processor, e.g., processor 122, and requesting a LIDAR scan from one or more sensors, e.g., sensor 120, of an area, e.g., landing zone 110, to obtain LIDAR point cloud data of the landing zone 110 as a continuous stream of points. Then at step 204, the point cloud data of the landing zone 110 captured using the sensor 120 (e.g., LIDAR sensor) are filtered based on the intensity of the features in the point cloud data. For example, a system implementing an embodiment described herein can search for points that are significantly higher in intensity than their neighbors. That is, the point cloud data may be filtered to retain only higher intensity markings. Moreover, certain embodiments may also perform edge detection on the point cloud data to identify markings as sharp changes in intensity are indicative of markings.

Figure 3:
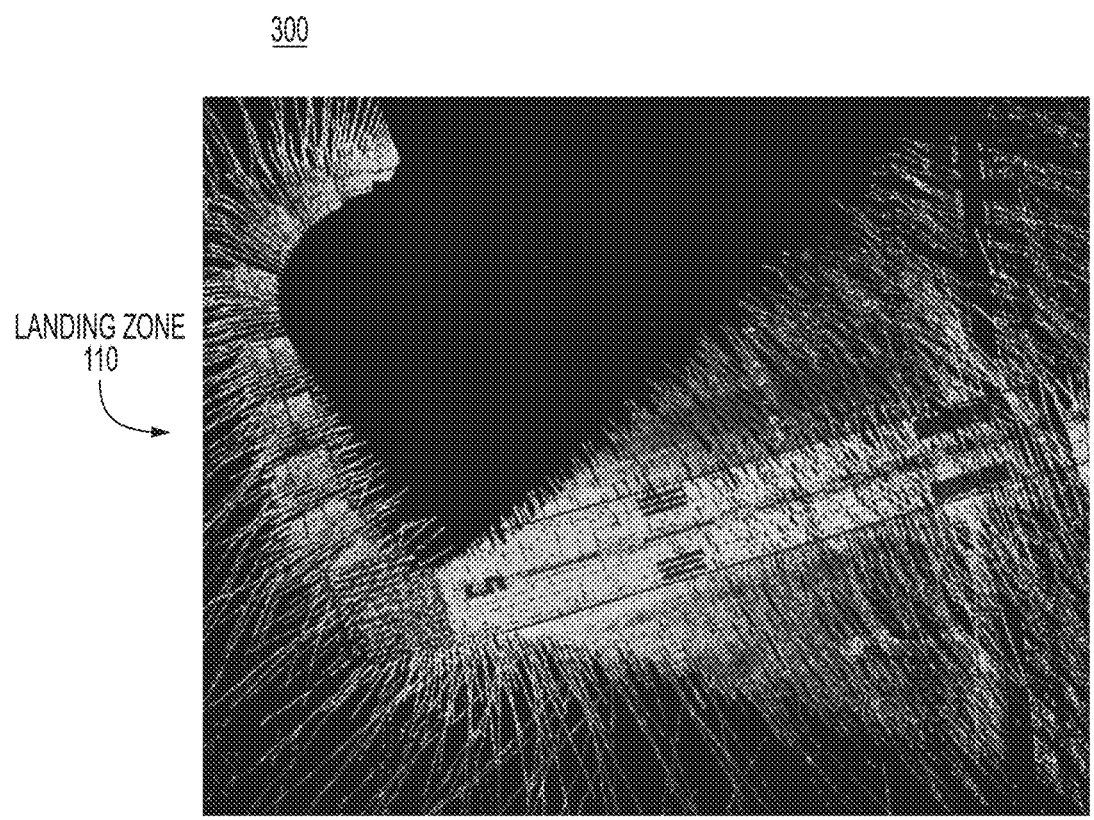
FIG. 3 is an exemplary image of a landing zone obtained using the system of FIG. 1.

For example, as shown in FIG. 3, point cloud data 300 captured using LIDAR sensors may show various features of a landing zone 110 having differing degrees of intensity. As shown, paint markings on a runway denoting runway numbers and touchdown markings may be higher in intensity than the gravel or patches of grass at the landing zone. The point cloud data 300 captured by the sensor 120 may be filtered to include only the high intensity areas corresponding to numbers and markings.

Referring back to FIG. 2, at step 206, the filtered points are then matched/compared to templates stored in a database (e.g., database 134). As the filtered points are received, at step 208, the filtered points in the point cloud data are compared with templates for runway markings stored in database 134 to verify the markings as corresponding to an intended landing zone, such as a designated helipad or runway. In other words, the filtered points are run through template matching algorithms, which can identify which regions of the point cloud correspond to which markings and geo-locate the markings. Features may be extracted from filtered point cloud data using feature extraction techniques. For example, with runway numbers, optical character recognition (OCR) may be used to "read" the numbers and uniquely identify runways. Centerline headings may also be used to verify runways by using techniques described herein.

At step 210, the identified landing zone may be communicated to a flight control system and/or an operator using, for example, communication interface 140. Identification of runways may be useful in guiding landings, such as autonomous landing of a UAV, in which the UAV may receive a runway number for landing from a control tower or from a command center. The UAV may detect and identify the appropriate runway using an embodiment of system 100 described herein. Advantageously, said UAV would not need ground operator instructions in identifying the correct runway or landing zone. Furthermore, the identified landing zone can be communicated to one or more flight control systems (e.g., multiple UAVs) and/or a flight operator for subsequent use.

Figure 4:
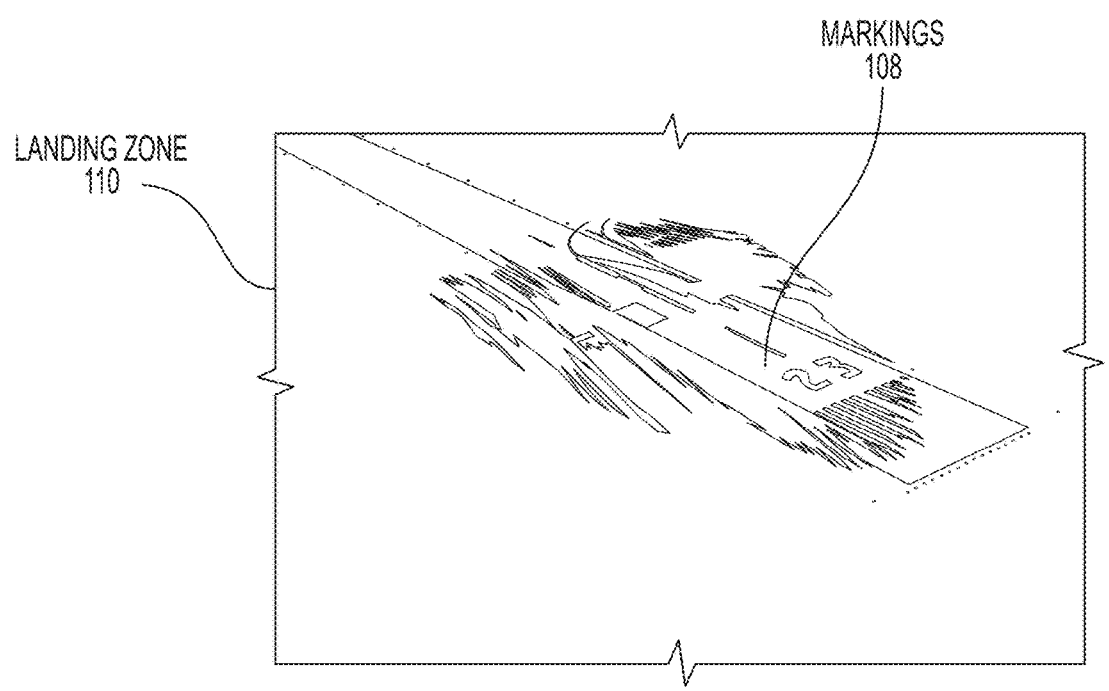
FIG. 4 shows another exemplary image of a landing zone obtained using the system of FIG. 1.

FIG. 4 shows an illustrative image of a landing zone obtained using an embodiment of system 100 described herein. As shown in FIG. 4, the image of landing zone 110 shows only high intensity markings corresponding to runway markings 108. Runway markings 108 may include a runway number, which may be "read" using OCR and compared to specific runway numbers received from a control tower or command center so as to guide an aircraft 104 in identifying the appropriate runway for landing.

Advantageously, embodiments described herein allow aircraft using embodiments of the system to uniquely identify runways. As such, a ground operator need only specify a runway number instead of an exact point at which to land. The aircraft can then identify landing zones on the appropriate runway. Locating markings also allows for the system to pick conventional sites to touch down. This will reduce ground operator workload, and allow for untrained operators to more easily command the aircraft.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "device," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is intended to provide a brief, general description of an illustrative and/or suitable exemplary environment in which embodiments of the above described present invention may be implemented. FIG. 1 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The methods and systems of the present disclosure, as described above and shown in the drawings, provide for sensor-based detection and identification of landing zones using markings on the landing zone. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of detecting a landing zone, comprising:
    scanning, using a sensor system, an area to obtain data of the area;
    identifying, using a processor, one or more markings from the data, wherein the one or more markings include a runway number identified through optical character recognition;
    verifying, using the processor, the one or more markings as corresponding to an intended landing zone by comparing the identified runway number with a runway number received from a flight control tower; and
    autonomously landing an unmanned aerial vehicle (UAV) at the intended landing zone using the verified one or more markings.

2. The method of claim 1, wherein scanning the area includes using a Light Detection and Ranging (LIDAR) system configured to emit an optical beam to obtain point cloud data of the area based on a returned portion of the optical beam, and filtering the point cloud data based on intensity of the returned portion of the optical beam.

3. The method of claim 2, wherein the LIDAR system includes a laser and an optical sensor and the area corresponds to one of a helipad and a runway.

4. The method of claim 2, wherein the point cloud data is obtained as a continuous stream of points including intensity information for the scanned area.

5. The method of claim 4, wherein the filtering the point cloud data includes searching for points that are higher in intensity than neighboring points.

6. The method of claim 5, wherein the filtering includes performing edge detection on the point cloud data.

7. The method of claim 6, wherein identifying the one or more markings includes running filtered points through a template matching algorithm comparing the one or more markings against one or more templates stored in a database.

8. The method of claim 1, further including communicating the intended landing zone to at least one of a flight control system and a flight controller.

9. A system for detecting a landing zone, comprising:
wherein the system is operatively connected to an unmanned aerial vehicle (UAV); and
wherein the system comprises:
a processor operatively connected to one or more sensors and configured to perform machine readable instructions that, when executed by the processor, cause the UAV to:
scan an area using the one or more sensors to obtain data of the area;
identify one or more markings from the data, wherein the one or more markings include a runway number identified through optical character recognition; and
verify the one or more markings as corresponding to an intended landing zone by comparing the identified runway number with a runway number received from a flight control tower;
wherein the UAV autonomously lands at the intended landing zone using the verified one or more markings.

10. The system of claim 9, wherein the one or more sensors include a Light Detection and Ranging (LIDAR) system having a laser and an optical sensor mounted on the UAV, the LIDAR system configured to emit an optical beam to obtain point cloud data of the area based on a returned portion of the optical beam.

11. The system of claim 10, wherein the system is further configured to filter the point cloud data based on an intensity of the returned portion of the optical beam.

12. The system of claim 11, further including a database operatively connected to the processor, wherein identifying the one or more markings includes running filtered points through a template matching algorithm comparing the one or more markings against one or more templates stored in the database.

13. The system of claim 9, wherein the area corresponds to a runway.

14. The system of claim 9, further including a flight control system configured to receive information relating to the intended landing zone.

* * * * *